United States Patent [19]

Cantrell

[11] Patent Number: 6,017,475

[45] Date of Patent: Jan. 25, 2000

[54] PROCESS OF TRANSFORMING HOUSEHOLD GARBAGE INTO USEFUL MATERIAL

[75] Inventor: Thomas E. Cantrell, McMinnville, Tenn.

[73] Assignee: Bouldin & Lawson, Inc., McMinnville, Tenn.

[21] Appl. No.: 09/062,759

[22] Filed: Apr. 20, 1998

[51] Int. Cl.[7] .............................. B29C 47/00; D21B 1/32; D21H 11/00

[52] U.S. Cl. .............................. 264/140; 162/4; 210/767; 264/211; 264/913; 264/914

[58] Field of Search .................................... 264/140, 211, 264/913, 914; 162/4; 210/767

[56] References Cited

U.S. PATENT DOCUMENTS

| | | | |
|---|---|---|---|
| 4,012,231 | 3/1977 | Dreer | 106/407 |
| 4,540,467 | 9/1985 | Grube et al. | 162/4 |
| 5,302,331 | 4/1994 | Jenkins | 264/914 |
| 5,849,152 | 12/1998 | Arnold et al. | 264/913 |

*Primary Examiner*—Leo B. Tentoni
*Attorney, Agent, or Firm*—Rick R. Wascher

[57] ABSTRACT

An apparatus, system, and batch or continuous flow method of thermodynamically reducing and converting household garbage into useful by-products capable of being recycled and reused or otherwise transformed into useful articles. The method of transforming household garbage into useful material comprises the steps of: providing a quantity of household garbage having a first volume and a liquid content; reducing the garbage having a first volume to an aggregate shard having a second volume smaller then the first volume; optionally expelling liquid from the aggregate shard; and heating the aggregate shard under pressure greater than ambient pressure to create an aggregate shard pulp. An embodiment of the system includes: a grinder for reducing the volume of the household garbage to an aggregate shard; an optional expeller for extracting liquids from the aggregate shard; and a hydrolizer which may be a batch or a continuous flow hydrolizer for decomposing the remaining aggregate shard after the liquid has been removed and transforming it into an aggregate shard pulp.

17 Claims, 2 Drawing Sheets

PROCESS OF TRANSFORMING HOUSEHOLD GARBAGE INTO USEFUL MATERIAL

BACKGROUND OF THE INVENTION

1. Field of the Invention

The present invention relates generally to solid waste disposal. Solid waste disposal can be generally defined as the disposal of normally solid or semi-solid materials, resulting from human and animal activities, that are useless, unwanted, or hazardous. Solid wastes, therefore, typically may be classified in the following manner: "garbage" which is decomposable wastes from food; "rubbish" which is decomposable wastes, either combustible (such as paper, wood, and cloth) or non-combustible (such as metal, glass, and ceramics); "ashes" which is the residue of the combustion of solid fuels; "large wastes" which is demolition and construction debris and trees; dead animals; "sewage treatment solids" which is the material retained on sewage-treatment screens, settled solids, and biomass sludge; "industrial wastes" which includes such materials as chemicals, paints, and sand; "mining wastes" which includes slag heaps and coal refuse piles; and, "agricultural wastes" including farm animal manure and crop residues.

The present invention is primarily directed to the reduction, conversion, decomposition, and destructive distillation of garbage and rubbish (hereinafter collectively referred to as "household garbage") into useful by-products capable of being recycled and reused or otherwise transformed into useful articles.

2. Description of the Related Art

By far the most common method of disposing of solid wastes in the United States is the deposition of such wastes on land or in "landfills" which may account for more than ninety percent of the nation's municipal refuse. Incineration accounts for most of the remainder, whereas composting of solid wastes accounts for only an insignificant amount. Historically, a municipality's chosen disposal method depended almost entirely on costs, and more recently environmental conditions, both of which in turn are likely to reflect the local circumstances.

A sanitary landfill is the cheapest satisfactory means of disposal, but only if suitable land is within economic range of the source of the wastes. Typically, collection and transportation costs account for seventy-five percent of the total cost of solid waste management. In a modern landfills, refuse is spread in thin layers, each of which is compacted by heavy industrial equipment such as bulldozers before the next layer is spread. When about 3 meters of refuse has been laid down, it is covered by a thin layer of clean earth which also is compacted. Pollution of surface and groundwater is believed to be minimized by lining and contouring the fill, compacting and planting the cover, selecting proper soil, diverting upland drainage, and placing wastes in sites not subject to flooding or high groundwater levels. Gases are generated in landfills through anaerobic decomposition of organic solid waste. If a significant amount of methane is present, it may be explosive; therefore, proper venting and burning of the methane gases are often necessary to eliminate or alleviate these dangerous conditions.

Another method of solid waste disposal is incineration. Incinerators of conventional design burn refuse on moving grates in refractory-lined chambers. The combustible gases and the solids they carry are burned in secondary chambers. Combustion is eighty-five to ninety percent complete for the combustible materials. In addition to heat, the products of incineration include the normal primary products of combustion including carbon dioxide and water, as well as oxides of sulfur and nitrogen and other gaseous pollutants. The nongaseous products are fly ash and unburned solid residue. Emissions of fly ash and other particles are often controlled by wet scrubbers, electrostatic precipitators, and bag filters. Incineration methods of disposing of cellulose material take the cellulose material to the burning point which is known to destroy the hemicellulose sandwiched between the lignin and cellulose components of woody cellulose materials (see the explanation set forth below) thereby breaking the bonds comprising the cellulose material which, in turn, allow it to rapidly degrade.

Landfill and incineration methods of disposal are known to pose significant environmental problems and concerns for the municipality, government, private industry, and individuals.

A growing trend associated with the treatment and handling of solid waste material may be referred to here as "resource recovery". Resource recovery systems are intended to recover useful materials from raw municipal refuse (e.g., household garbage) and may include grinding or shredding machines, magnetic separators, air classification that separates the light and heavy fractions, screening, and/or washing. Resource recovery methods, therefore, attempt to reduce (i.e., recycle) the solid waste into a more manageable, although not always useful, form. Resource recovery systems can be considered thermal processes, generally, but more specifically, a combustion processes or pyrolysis processes. The cellulose element can be defined as the chief substance composing the cell walls or woody part of plants. Cellulose is known to be a carbohydrate of unknown molecular structure but having the composition represented by the empirical formula $(C_6H_{10}O_5)_x$. Prior to the creation of the present invention, a constituent element of "woody" cellulose materials, hemicellulose, which serves as the binding agent for the constituent elements of the wood-like cellulose molecule, has been destroyed by known resource recovery methods. The other constituent elements of woody cellulose materials are lignin and cellulose.

Lignins are major constituents of plant matter. Lignins can be defined as an organic substance closely allied to cellulose and forming the essential part of woody fibers. On the basis of chemical and biological degradations, lignins are considered to be polymers or prophyl-phenyl compounds, coniferyl and related alcohols. Over the years solubilization techniques have been suggested as tools for deducing the structure of coals, oxidation, hydrogenation, alkaline hydrolysis, pyrolysis and extraction with powerful solvents.

With respect to the ability to disassociate the hemicellulose from cellulose-containing materials, these techniques are believed to be of limited utility considering their harsh and destructive nature. Furthermore, the known methods of disassociation incorporating the use of solvents and oxidants often pose environmental concerns and for this reason are also not particularly desirable.

Hemicellulose constitutes from 35% to 50% of the polysaccharides in the cell wall substance of cellulose fibers and from 20% to 35% of the total dry weight of the wall fibers. The definition of hemicellulose is even less precise than that of most other plant constituents and is based mainly on chemical behavior.

The hemicellulose is composed of two general classes of substances: (1) those collectively called xylons whose molecules are formed by polymerization of the anhydro forms of pentose sugar; 22 and, (2) glucomannans, whose molecules are formed by polymerization of anhydro forms of hexose, mainly glucose and mannose. These "sugars" and elements having amino acid bases or subconstituents are not readily disassociated without destroying them. Combustion processes and pyrolysis processes are known to destroy or deform the constituent sugars and amino acids (in exothermic reactions), thereby eliminating the ability to disassociate them and recombine them in a resource-recovery-like manner. In this way the sugars and amino acids act as bonding agents for cellulose molecules even though the sugars and amino acids bases did not originate from materials typically associated with cellulose. That is, combustion and pyrolysis processes are known to destroy the hemicellulose and prevent its use as a bonding agent to form other molecules of cellulose, even though the hemicellulose did not originate from recognizable cellulose materials, e.g., cardboard, paper, wood, etc.

With respect to the ability to recombine the disassociated hemicellulose with the other constituent elements of are cellulose fibers and particles, hemicellulose has three known attributes which enable it to aggregate in polar liquid.

First, the shape of the hemicellulose molecule is a uniform ribbon-like structure with a crosssection similar to plastic-like fibers. Second, the carbon-to-carbon bonding gives high rigidity and coherence; and third, the numerous hydroxyl (OH) groups are available along the length of the molecule to lateral bond chains of fly ash and other polymers. As a result, the hemicellulose fibers have a tendency to become closely packed and regularly spaced along parts of their length with their flat faces sandwiched together. These regions of high molecular orientation have diffraction patterns similar to crystalline solids. In addition, the hemicellulose extracted pursuant to the method of the present invention may also contain impurities in the form of bacteria that is trapped in the interstices of the hemicellulose.

Pyrolysis, also called destructive distillation, is the process of chemically decomposing solid wastes by the introduction of heat in an oxygen-reduced atmosphere. This results in a gas stream containing primarily hydrogen, methane, carbon monoxide, carbon dioxide, and various other gases and inert ash, depending on the organic characteristics of the material being pyrolyzed. The hemicellulose in these pyrolysis processes is destroyed.

Yet another approach to the treatment of raw municipal refuse (e.g., household garbage) is know as a "wet pulping process". In a wet pulping process the incoming refuse is mixed with water and ground into a slurry in an apparatus referred to as a wet pulper—a machine that is similar to a large kitchen disposal unit. Large pieces of metal and other non-pulpable materials are separated by a magnetic separator, and the residue is used as landfill. The slurry from the pulper goes into a centrifugal device called a liquid cyclone, which separates heavier non-combustibles such as glass, metals, and ceramics. The heavy fraction goes to a glass and metal recovery system; the light fraction goes to a paper and fiber recovery system. Combustible residues are mixed with sewage sludge, mechanically dewatered, and incinerated. Noncombustible residues are used as landfill.

The art to which the invention relates generally includes U.S. Pat. No. 4,012,231 granted to Dreer, incorporated by reference as if fully set forth herein, is directed to a process for the manufacture of fillers from solid waste. The Dreer invention can be described as a wet-pulping process of grinding solid waste magnetically freed from iron particles, supplied with sewage sludge or water, fractionated into portions of different size and treated in a fermentation process for about 24 hours. Various solvents and reactant solutions or materials are then used to transform the compost.

In all known methods of solid waste reduction, treatment or resource recovery, the resultant product (i.e., end or by-products) of the solid material may include microbes or microorganisms that require further consideration prior to disposal. In such cases the by-products are believed to remain waste materials not suitable for use or transformation into useful articles. Furthermore, the useful hemicellulose material is known to be destroyed to a large degree and thus wasted, because it is not reused to form other useful substances.

The present invention, including its apparatuses and methods, relate generally to resource recovery methods, and some of the physical characteristics associated with the thermodynamic processes of destructive distillation, wet pulping, decomposition, and sterilization. Until now, a resource recovery apparatus and method of incorporating select elements of the aforementioned processes or systems into an efficient, safe and economical resource recovery system, wherein the end by-products including hemicellulose, cellulose and other organic fibers capable of being reused, has not been invented.

SUMMARY OF THE INVENTION

It is important for a complete appreciation of the present invention to consider and understand the physical events of the inventive process and associated apparatus. The methods of the present invention can, therefore, best be explained by an analysis of the various physical events (e.g., chemical reactions) which can be summarized in the following.

It is commonly accepted that all matter, including household garbage, must occupy one of three physical states (e.g., solid, liquid or gas) and be governed by the phase rule of matter and conservation of matter principles. The phase rule provides a mathematically expressive model to describe the conservation of matter in any one of the three phases or states. Thus, a chemical system is any combination of chemical components under observation. The phase of a substance refers to its occurrence as either a solid, liquid, or gas; and phase changes in pure substances occur at definite temperatures and pressures. A solution of salt in water, for example, is a chemical system in which the components are salt and water. The chemical components of a system can exist as gas, liquid, or solid phases.

The phase rule is expressed by the equation $F=C-P+2$, where F is the number of variables (usually temperature, pressure, and concentration) that can be changed without causing the disappearance of a phase or the appearance of a new one. C represents the number of chemical components of the system and P the number of phases present.

The products obtained from a given set of reactants, or starting materials (in this case the constituent elements of the household garbage), depend on the conditions under which a chemical reaction occurs. Careful study, however, shows that although products may vary with changing conditions, some quantities remain constant during any chemical reaction. These constant quantities, called the conserved quantities, include the number of each kind of atom present, the electrical charge, and the total mass. Hence, the molecules comprising the household garbage may conceivably undergo transformation or be broken down into their constituent molecular elements such that a solid waste may be converted to solid, liquid, and gas states of matter.

In this fashion the molecules comprising a specific identity that make up the pieces of household garbage, for example, banana peels, cereal boxes, and plastic bottles, could undergo varying changes in phase or "identity" on the molecular level, so long as matter is conserved and not destroyed in accordance with the phase rule and conservation of matter principles discussed above.

Furthermore, it is commonly accepted that a number of physical changes are associated with the change of temperature of a substance. Almost all substances expand in volume when heated and contract when cooled.

The process of changing from solid to gas is referred to as sublimation, from solid to liquid as melting, and from liquid to vapor as vaporization. If the pressure is constant, these processes occur at constant temperature. The amount of heat required to produce a change of phase is called latent heat; hence, latent heats of sublimation, melting, and vaporization exist.

It is generally accepted that the attractive force between two or more atoms resulting from for example, the attraction between the electrons of individual atoms and the nuclei of one or more of the other atoms can be broken or separated by a thermodynamic process. In the case of the present invention, the breaking of the molecular bonds between the lignin, hemicellulose, and cellulose is performed through thermodynamic catalysis. For example, foodstuffs can be virtually eliminated except for trace elements (e.g., sugars and saccharides) of their composition, while cellulose products may be transformed to fibrous material owing to the stronger attraction between the constituent atoms. Contrasting that with organic matter such as plastics and glass, which may still exist throughout the process because of the strength of their inorganic chemical bonds, can be reduced in size to the point of making them virtually imperceptible to the human eye. Thus, all chemical bonds result from the simultaneous attraction of one or more electrons by more than one nucleus—bonds which can be broken.

If the bonded atoms are of metallic elements, the bond is said to be metallic. The electrons are shared between the atoms but are able to move through the solid to give electrical and thermal conductivity, luster, malleability, and ductility. Such bonds are known not to be readily broken in most thermodynamic processes, hence the desirability to remove heavy metals (e.g., ferrous metals, carbon steels, etc.) and related alloys from the household garbage prior to processing in accordance with the present invention Metallic items such as common food cans, soda cans and the like may be processed in accordance with the present invention. In fact, such items are in some instances believed to be desirable in some of the end products produced in accordance with the present invention.

On the other hand, if the bonded atoms are non-metals and are non-polar covalent (identical as in $N_2$ or $O_2$, the electrons are shared equally between the two atoms) or polar covalent (differ as in nitric oxide (NO) the electrons are shared unequally) these substances are not electrical conductors, nor do they have luster, ductility, or malleability, and are more easily broken down in thermodynamic processes. Thus, it is important to point out that some metallic bonds are readily broken (e.g., $SiO_2$, $Al_2O_3$, $TiO_2$, etc.).

An understanding of reaction mechanisms of the present invention can be gained from a study of ionic and covalent bonding. The joining of two groups is often called addition; their separation is called decomposition. Decomposition, in chemistry, is the breaking down of a substance or compound through a chemical reaction into its simpler components. Such reduction may yield either elements or compounds as products. A common agent of decomposition in chemistry is heat, or heat coupled with pressure in adiabatic processes, which can reduce both inorganic and organic compounds to their constituents.

Decomposition may also be caused by bacteria, enzymes, and light. Fermentation, for example, occurs because of enzyme actions. Thus the term decomposition is also applied to the phenomenon of biological decay, or putrefication, caused by microorganisms.

The practice of the present invention, among other things as will be described below, causes the bacterial microbes to die and excite the molecules bonding the lignin, hemicellulose, and cellulose and, thus, form an unstable link in the hemicellulose stacks. The unstable link, due to the forces associated with strong bonds, causes the bacterial site to implode freeing the pure hemicellulose from its stacked bundles. The pure hemicellulose can then be recombined with other elements to form woody cellulose materials such as fibers, cellulose acetate (sometimes referred to as "cellulate") used to form artificial silks, photographic films, etc., cellulose flour capable of being used as a substitute for flour providing bulk and satisfying hunger without nourishment, or cellulose nitrate used in the manufacture of guncotton, explosives, rayon, varnishes, etc.

However, considering that energy is conserved in chemical reactions, if stronger bonds form in the products than are broken in the reactants, heat is released to the surroundings, and the reaction is termed exothermic. If stronger bonds break and then are formed, heat must be absorbed from the surroundings, and the reaction is endothermic. Because strong bonds are more apt to form than weak bonds, spontaneous exothermic reactions are common. For example, the combustion of carbon-containing fuels with air yields give $CO_2$ and $H_2O$ having strong bonds. With respect to the present invention, the disassociation of the lignin, hemicellulose and cellulose is an exothermic reaction.

Endothermic reactions are always associated with the spreading, or the dissociation, of molecules. This may be measured as an increase in the entropy of the system. The net effect of the tendency for strong bonds to form and the tendency of molecules and ions to spread out, or disassociate, may be measured as the change in free energy of the system. All spontaneous changes at constant pressure and temperature, as preferred in the present invention, involve an increase in free energy with a large increase in bond strength, or a large increase in spreading out, or both.

Thus, some reactions, such as explosions (or implosions), occur rapidly. Other reactions, such as rusting, take place slowly. Chemical kinetics, the study of reaction rates, shows that three conditions must be met at the molecular level if a reaction is to occur: The molecules must collide; they must be positioned so that the reacting groups are together in a so-called transition state between reactants and products; and the collision must have enough energy to form the transition state and convert it into products. Fast reactions occur when these three criteria are easy to meet, as in the case of the conditions presented by the apparatus of the present invention to perform the method of the present invention. If even one is difficult, however, the reaction is typically slow, even though the change in free energy permits a spontaneous reaction (e.g., inorganic matter). Thus, the methods and apparatus of the present invention establish suitable conditions for the "implosion" of the cellulose molecule thereby freeing the lignins and hemicellulose from the cellulose. The hemicellulose can now be purified according to the inventive processes, along with the raw cellulose molecules, which may rapidly recombine to form purified, sterile (explanation below) materials.

Hence, the entropy of the inventive system, while in a constant state of flux, enables recombinative events to occur. That is, where strong bonds are broken from organic and inorganic materials and the molecules are disassociated due to the free energy of the system, the recombinative result of the molecules and ion has a tendency to produce (or recombine to form) strong bonds. Thus, the constituent elements of organic materials can recombine with other molecules and ions to form new substances such as woody, carbon containing, cellulose materials and fibers because of the tendency for strong bonding and the ease at which the same takes place, both of which are inherent traits of cellulose and fibrous materials.

Rates of reaction are known to increase in the presence of catalysts (substances that provide a new, faster reaction mechanism, but are themselves regenerated so that they can continue the process). Rates of reaction then may be changed, or optimized, not only by catalysts, but also by changes in temperature and by changes in concentrations which themselves serve as pseudo-catalysts (hereinafter simply considered "catalysts"). Raising the temperature increases the reaction rate by increasing the kinetic energy of the molecules of the reactants, thereby increasing the likelihood of transition states being achieved. Increasing the concentration may increase the reaction rate by increasing the rate of molecular collisions. Water, in the form of heated steam is used to heat the air space between the vessel and vessel jacket as described below, which, in turn, increases the temperature of the moist household garbage within the vessel. The moisture and bacteria associated with household garbage, in the presence of the appropriate conditions including induced heat, serve to catalyze the reaction rate within the vessel and facilitate the decomposition of the household garbage.

As a reaction proceeds, the concentration of the reactants usually decreases as they are used up. The rate of reaction will, therefore, decrease as well. Simultaneously, the concentrations of the products increase, so it becomes more likely that they will collide with one another to reform the initial reactants. Eventually, the decreasing rate of the forward reaction becomes equal to the increasing rate of the reverse reaction, and net change ceases. At this point the system is said to be at chemical equilibrium Forward and reverse reactions occur at equal rates. Practice of the method of the present invention, sufficient to disassociate the hemicellulose from the lignins and cellulose carbohydrates, is preferably fifteen (15) minutes, but may vary from three (3) minutes to approximately thirty (30) minutes.

Changes in systems at chemical equilibrium are described by Le Chatelier's principle: Any attempt to change the equilibrium system causes it to react so as to minimize the change. Raising the temperature causes endothermic reactions to occur; lowering the temperature leads to exothermic reactions. Raising the pressure favors reactions that lower the volume, and vice versa. Hence, the volume reduction of the incoming household garbage to the cellulose shard pulp is approximately one third. Increasing any concentration favors reactions using up the added material; decreasing any concentration favors reactions forming that material.

Thus, the present inventive process can also be described thermodynamically and find support in the laws of thermodynamics as follows. The central concept of thermodynamic component of the invention is that of the macroscopic system, defined as a geometrically isolable piece of matter in coexistence with an infinite, unperturbable environment. The state of a macroscopic system in equilibrium can be described in terms of such measurable properties as temperature, pressure, and volume, which are known as thermodynamic variables. Many other variables (such as density, specific heat, compressibility, and the coefficient of thermal expansion) can be identified and correlated to produce a more complete description of an object and its relationship to its environment. When a macroscopic system moves from one state of equilibrium to another, a thermodynamic process is said to take place. Some processes are reversible and others are irreversible.

One useful way of discussing thermodynamic processes is in terms of cycles, processes that return a system to its original state after a number of stages, thus restoring the original values for all the relevant thermodynamic variables. In a complete cycle the internal energy of a system depends solely on these variables and cannot change. Thus, the total net heat transferred to the system must equal the total net work delivered from the system.

The recognition that all matter is made up of molecules provided a microscopic foundation for thermodynamics. A thermodynamic system consisting of a pure substance can be described as a collection of like molecules, each with its individual motion describable in terms of such mechanical variables as velocity and momentum.

The conservation of energy, a well-known law of mechanics, translates readily to the first law, and the concept of entropy translates into the extent of disorder on the molecular scale. By assuming that all combinations of molecular motion are equally likely, thermodynamics shows that the more disordered the state of an isolated system, the more combinations can be found that could give rise to that state, and hence, the more frequently it will occur. This is the reason cellulose and cellulose-like fibers predominant the end product when the chemical reactions described above reach equilibrium, and the process is said to have been completed. It follows then, the probability of the more disordered state occurring overwhelms the probability of the occurrence of all other states. This probability provides a statistical basis for definitions of both equilibrium state and entropy.

The present invention can also be further defined as a thermodynamic process that decomposes the combination of molecules and ions by overcoming the existing attractive forces in a thermodynamic catalytic process.

With regard to the inherent sterility of the end product after application of the inventive process, resort to the methods of food canning is informative. Canning is sometimes called sterilization, because the heat treatment of the food eliminates all microorganisms that can spoil the food and those that are harmful to humans, including directly pathogenic bacteria and those that produce lethal toxins. Most commercial canning operations are based on the principle that bacteria destruction increases tenfold for each 18 degree F. increase in temperature. Thus, at approximately 350 degrees F., the preferred temperature within the vessel at the preferred constant pressure of 120 psi gauge, no known microbe or bacteria is believed to survive. It is important to note, however, that the process of the present invention can also be carried out at other temperatures and pressures. Thus, the dead bacterial microbes establish the weak link in the cellular bonds to enable the implosions of the molecular lattice and the disassociation of the constituent elements of the cellulose.

Although both these terms, canning and sterilization, are applied to the removal of water from food, to the food technologist drying refers to natural desiccation (such as spreading fruit on racks in the sun) and dehydration designates drying by artificial means (such as a blast of hot air). Heating the end product from the vessel, therefore, further insures the sterility of the pulp like product produced by the inventive process.

The preferred apparatus or system of the present invention preferably includes the following components to carry out the method of the present invention. A grinder, shredder, or other material reduction apparatus is used to reduce the incoming particle size of the household garbage to a more usefull particle size such that the end particles may comprise compost materials, if the original material is organic, and convert inorganic materials into a reusable particle form There are several varieties of commercially available grinder or shredder apparatuses. Hammer mills, grinders, and shredders are known to be used to reduce the incoming particle size to a more useful particle size such that the end particles may comprise a reusable particle form. Hammer mills incorporate a rotating drum, or spindle, with free-floating hammers. The hammer mill is designed to spin at a relatively high speed. Material placed in front of the rotating drum is impacted by the hammers. Hammer mills, therefore, do not cut, shred or tear the material, but rely on impact forces to pulverize the material.

Grinding is actually a cutting operation in which each grit that comes in contact with the material cuts out a minute chip, or swarf. Grinding machines are machine tools equipped with grinding wheels and suitable means for holding, positioning, rotating, or traversing the work piece so that it can be ground to the desired size, shape, and finish The grinding wheel is typically mounted on a motor-driven spindle that turns the wheel at a rated velocity depending upon the configuration of the machine used.

Shredders typically incorporate a pair of rotatable parallel shafts having spaced apart cutters. The cutters resemble flats formed on circular lobes. A first shaft is positioned in parallel alignment with a second shaft enabling the lobes of the first shaft to occupy the interstices between the lobes of the second shaft and vice versa.

The preferred embodiment of the present invention incorporates the use of a grinder apparatus manufactured and sold by the Ecology Division of Bouldin & Lawson, Inc., of McMinnville, Tenn.

The resultant ground material or raw "shard" is then transferred, either automatically or manually, to an expeller unit of virtually any suitable, commercially available configuration. The preferred expeller unit operates as a "hard press" or screw press. The hard press or screw press typically has a material inlet and a material exit. The internal screw-like shaft serves as a ram to shuttle the shard along an internally tapered tunnel. Thus, as the tunnel is restricted the shard is squeezed within the confines of the tunnel to force moisture from the shard prior to its exit from the expeller unit.

When the shard exits the expeller unit (depending upon the application), the material is known to be reduced in volumetric proportion to approximately 30% to 75% of its original volume (depending upon the materials), with a moisture index of approximately 15% to 40%. In one embodiment of the inventive process the shard is then introduced into a hydrolizer to remove as much of the moisture as desired depending upon the application.

As alluded to earlier, the hydrolizer incorporates a containment vessel having an exterior jacket and an airspace between the vessel and the jacket. A heated steam inlet and exit are attached to the jacket and communicate with the air space. When the shard from the expeller is introduced into the hydrolizer, either automatically or manually, the operator introduces heated stem into the air space surrounding the vessel. The preferred temperature of the steam is 350 degrees Fahrenheit which, depending upon the preselected interior volume of the hydrolizer vessel, causes the interior to reach an internal pressure of about 120 psi in the manual version of the system.

Whereas, in an automated embodiment of the present invention where the various materials products are automatically transferred from system component to system component in a closed or contained system, the preferred pressure of the hydrolizer is 90 psi gauge with a corresponding preferred temperature of 331 degrees Fahrenheit.

Of course the process of the present invention can be carried out at other temperature and pressure ranges, but the associated time for completion of the inventive process at these other temperature and pressures will vary significantly. That is, the greater the temperature and pressure in the hydrolizer, the faster the chemical reactions occur. For example, a pressure range of 60 psi gauge to 400 psi gauge, equates to a temperature range of approximately 307 degrees Fahrenheit to 448 degrees Fahrenheit.

The pressure and temperature, in conjunction with the composition of the shard, acts as the catalyst to speed the chemical reaction of decomposition of the shard within the vessel. This high temperature and pressure environment causes the shard to rapidly decompose into its basic constituent elements, allows them to recombine as described above, and kills microbes and bacteria living within the shard.

When the hydrolysis is complete, the reduced shard or "aggregate cellulose pulp" is removed from the hydrolizer. The aggregate shard pulp end product is a mixture of cellulose fibers and other elements present in the shard prior to hydrolysis. The aggregate cellulose pulp is then sterilized in an optional commercial autoclave or dried in a commercial oven in preparation for separation and remanufacture into useful articles such as fire logs and paper, depending upon the chemical properties of various user selected additives. The aggregate cellulose pulp can be used to manufacture plasticene cross ties, and building materials such as bricks, blocks, and the like.

In yet another embodiment of the process of the present invention, the liquids and solutions (i.e., water and water-based solutions) extracted from the expeller are then separated to remove the trace amounts of oils, if any, from the water-based solutions. A centrifuge is then used to centrifuge out the solids, and heavy water solutions from the remaining water. The solids and heavy water solutions contain hemicellulate. This hemicellulate is believed to contain bacteria, and, thus, is transferred to a conventional autoclave for sterilization. The sterilized, pure hemicellulate may then be incorporated into the manufacture of useful products. The water left over from the centrifuge process can be reintroduced into the boiler supplying the steam for the system, and the trace amounts of oils, if any, may be sent for reclamation.

The present inventive method may, therefore, be summarized in a variety of ways, one of which is the following: a method of transforming household garbage into useful material comprising the steps of: providing a quantity of household garbage having a first volume and a liquid content; reducing the garbage having a first volume to a shard having a second volume smaller then the first volume; expelling liquid from the shard; and hydrolizing the shard under pressure greater than ambient pressure to create an aggregate cellulose pulp.

The step of hydrolizing the shard further comprises the step of regulating the temperature within the hydrolizer to be in the range from of 338 degrees Fahrenheit to 366 degrees Fahrenheit and regulating the pressure within the hydrolizer to be in the range from 100 psi to 150 psi gauge. The temperature may be regulated within the hydrolizer to be 350 degrees Fahrenheit and the pressure may be regulated within the hydrolizer to be 120 psi gauge.

The method further includes: capturing the liquid expelled from the shard; separating the captured liquid into an oil solution and a water-based solution; centrifuging the water based solution and removing the solid material therefrom; sterilizing the solid material removed from the water-based solution; drying the aggregate cellulose pulp; separating the aggregate cellulose pulp into pure cellulose pulp and an inorganic pulp mixture or cellulose pulp residue; introducing the aggregate cellulose pulp into an extruder and extruding the aggregate cellulose pulp; introducing the cellulose pulp into an extruder and extruding it; adding a quantity of material such as plastic to the cellulose pulp or aggregate cellulose pulp and introducing the combination of the plastic and aggregate cellulose pulp and/or cellulose pulp into the extruder to form a useful article such as a building block, railway cross-tie, fence or sign posts, etc.

The system of the present invention can be summarized in a variety of ways, one of which is the following: a system for transforming household garbage having a first volume into useful material, comprising: a grinder for reducing the volume of the household garbage to a shard; an expeller for extracting liquids from the shard; and a continuous flow hydrolizer for decomposing the remaining shard after the liquid has been removed and transforming it into an aggregate cellulose pulp.

The system further comprises: a dryer for drying the decomposed aggregate cellulose pulp; a separator for separating the liquid extracted from the liquid-containing shard into water based solutions or oil-based solutions, if any; a centrifuge to centrifuge the water based solution to remove the solids therefrom; an autoclave for sterilizing the solids removed by the centrifuge; an extruder for extruding the dried aggregate cellulose pulp; a separator for separating the aggregate cellulose pulp into pure cellulose pulp and an inorganic cellulose pulp mixture or residue; an extruder for extruding the cellulose pulp and/or the aggregate cellulose pulp mixture.

DETAILED DESCRIPTION OF THE PREFERRED EMBODIMENT(S)

Figure 1:
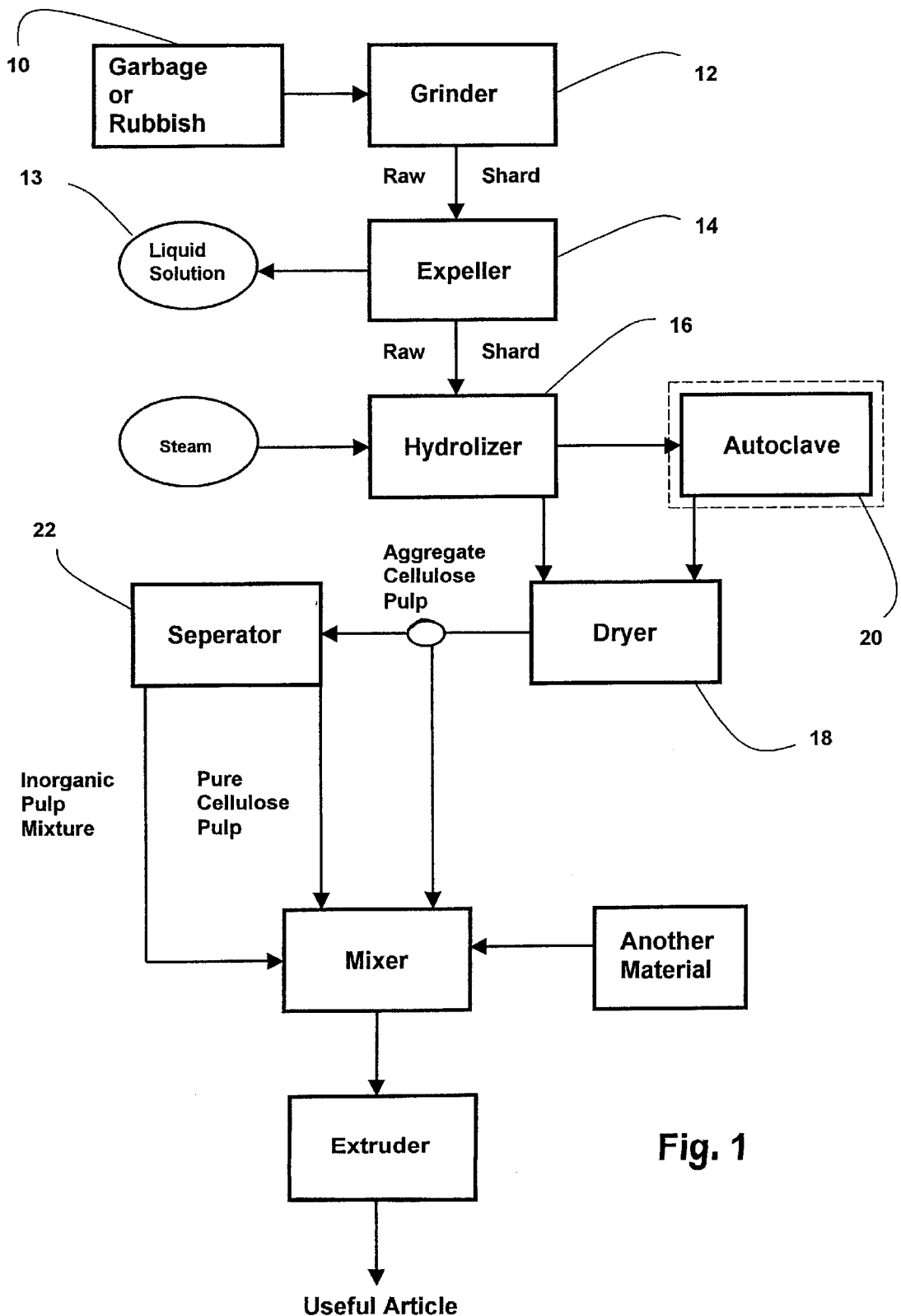
FIG. 1 is a schematic flow diagram of an embodiment of a system to carry out an embodiment of the method of the present invention with the corresponding components of the apparatus labeled and discussed below.

With reference to FIG. 1, household garbage, designated generally by block 10, is introduced into a hammer mill, grinder, shredder or other material reduction apparatus (collectively referred to as a "grinder") designated generally by the reference numeral 12. The preferred embodiment of the present invention incorporates the use of a grinder apparatus manufactured and sold by the Ecology Division of Bouldin & Lawson, Inc., of McMinnvilie, Tenn.

The garbage 10 is introduced into the grinder 12 and undergoes a surface area increase and an associated volume reduction, in that the material is pulverized, torn, or broken to reduce its original particle size. The resultant ground material is in then transferred, either automatically or manually, to an expeller unit 14 of any suitable commercially available configuration.

The preferred expeller unit 14 is a "hard press" or screw press. The hard press or screw press, typically, has a material inlet and a material exit. The shard is introduced into the expeller 14. The internal screw-like shaft serves as a ram to shuttle the shard along an internally tapered tunnel. Thus, as the tunnel is restricted the shard is squeezed within the confines of the tunnel to force moisture 13 from the shard prior to its exit from the expeller unit 14.

The expeller unit 14 is provided to remove water and liquid substances from the shard. Oils are known to impede the process of disassociating the usefull hemicellulose from the shard, and owing to the phase rule described above, the liquids can only be removed together and separated later. When the shard exits the expeller unit 14, depending upon the application, the material is known to be reduced in volumetric proportion to approximately 30%–75% of its original volume with a moisture index of approximately 15%–40%. The shard is then introduced into a hydrolizer 16. The preferred hydrolizer 16 may be a batch hydrolizer or a continuous flow hydrolizer capable of continuous flow capacities of 25,000 pounds per hour. The preferred hydrolizer components are manufactured by The Dupps Company of Germantown, Ohio. The hydrolizer 16 may be valve-controlled to insure the shard maintains the proper residence time within the hydrolizer and to minimize steam usage. A programmable logic controller may also be incorporated to provide automated control of the hydrolizing function.

The hydrolizer environment is preferably set at 120 psi gauge which gives rise to a temperature of approximately 350 degrees in the batch process. In the continuous flow process however, the hydrolizer has a preferred operating pressure of 90 psi gauge and a corresponding temperature of 331 degrees Fahrenheit. The hydrolizer may also operate in the range of temperatures from roughly 320 degrees Fahrenheit to 366 degrees Fahrenheit, with a corresponding pressure range of approximately 100 psi to 150 psi gauge.

The hydrolizer incorporates a containment vessel having an exterior jacket and an airspace between the vessel and the jacket. The jacket is an optional feature but it is known to be preferred in order to reach higher temperatures ranges during processing. A heated steam inlet and exit are attached to the jacket and communicate with the air space. When the shard is introduced into the hydrolizer, either automatically or manually, the operator introduces heated stem into the air space surrounding the vessel. The preferred temperature of the steam is 350 degrees Fahrenheit which, depending upon the preselected interior volume of the hydrolizer vessel, causes the interior to reach the preferred internal pressure of about 120 psi. The shard molecules then implode on the molecular level as described above. The high temperature and pressure of the hydrolizer environment is believed to kill the bacterial microbes creating sterile cellulose by products.

The pressure and temperature, and to some extent the existing bacteria, act as the catalyst to speed the chemical reaction of decomposition of the shard within the vessel. This high temperature and pressure environment causes the shard to rapidly decompose into its basic constituent elements as described above, which includes killing any microbes, or bacteria living within the shard.

When the hydrolysis is complete, the reduced shard is removed from the hydrolizer 16. The end product is an aggregate cellulose pulp having trace elements of metals, plastics, etc., macroscopically mixed therein. The aggregate cellulose pulp may then be dried in a commercial oven, or other suitable dryer mechanism 18, or sterilized with an optional autoclave 20 of any suitable configuration which is available commercially from a number of sources. The dried and/or sterilized material (aggregate cellulose pulp), may then be separated into pure cellulose pulp and cellulose pulp residue by a separator 22 in preparation for remanufacture into useful articles such as fire logs, paper, and feed supplements, and depending upon the chemical properties of various user selected additives, the pulp can be used to manufacture plasticene cross ties, building materials such as bricks, blocks, and the like.

Figure 2:
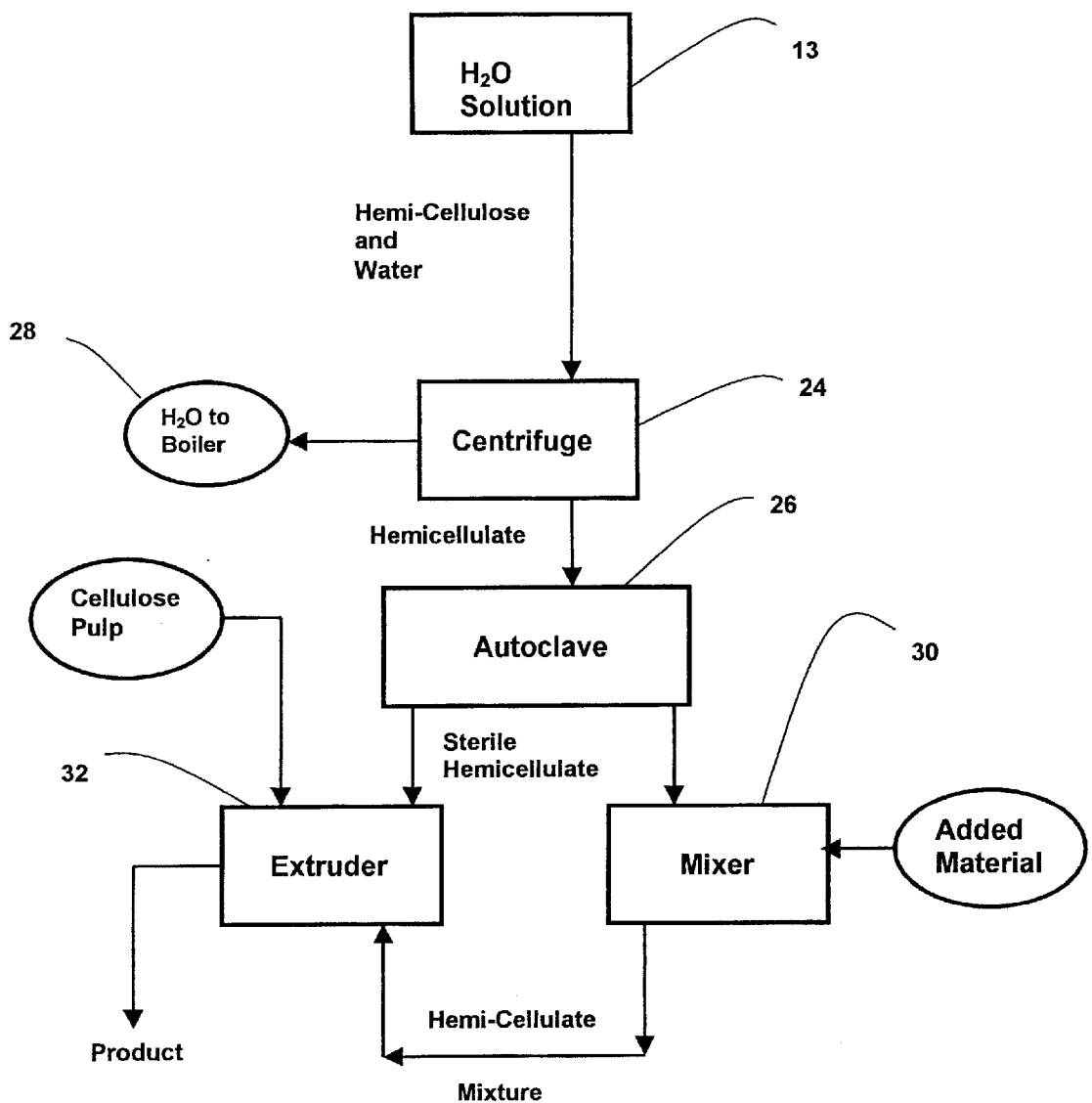
FIG. 2 is a schematic flow diagram of a secondary embodiment of the system and an alternate embodiment of the method of the present invention with the corresponding components of the apparatus labeled and discussed below.

With respect to FIG. 2, in an alternate embodiment of the present invention the liquids and solutions 13 (i.e., oils, water and water based solutions) extracted from the expeller 14 are then separated in a centrifuge 24 to separate the hemicellulate from the water and other liquid. The solids are known to include hemicellulate. This hemicellulate is believed to contain bacteria and is transferred to a conventional autoclave 26 for sterilization. The sterilized, pure hemicellulose may then be incorporated into the manufacture of useful products. The water 28 left over from the centrifuge process can be reintroduced into a boiler (not shown) which provides the steam for the system.

When the hemicellulate is removed from the autoclave 26, either manually or automatically, the hemicellulate is introduced into either a mixer 30 or an extruder 32. The mixer 30 enables additional materials such as plastics, fillers, binder, cellulose, hemicellulose, etc. to be added to the hemicellulate prior to introduction into the extruder 32. In the alternative, however, the sterile hemicellulate leaving the autoclave 26 may be directed to the extruder where the additional elements may be combined during the extrusion process. In either case, the end products are useful articles, the nature of which depends upon the process employed for forming the article.

These and other embodiments of the present invention shall become apparent after consideration of the scope of the specification and drawings set forth herein. All such alternate embodiments and equivalents are contemplated to be within the scope of the present invention whose only limitation is the scope of the appended claims.

What is claimed is:

1. A method for continuously transforming household garbage into useful material, comprising the steps of:

providing a quantity of garbage having a first volume and a liquid content;

reducing the garbage having a first volume to a shard having a second volume smaller then the first volume;

feeding the shard having the second volume into a hydrolizer;

hydrolizing the shard in a hydrolizer under pressure greater than ambient pressure to create an aggregate cellulose pulp; and removing the aggregate cellulose pulp from the hydrolizer.

2. The method of claim 1, wherein the feeding, hydrolizing and removing steps further include the step of:

continuously feeding the shard into a continuous flow hydrolizer, hydrolizing the continuously fed shard, and automatically removing the aggregate cellulose pulp from the hydrolizer.

3. The method of claim 2, wherein the steps of continuous feeding and hydrolizing the shard and the automatic removal of the aggregate cellulose pulp occurs continuously with the passage of time.

4. The method of claim 3, wherein the steps of continuous feeding and hydrolizing the shard and the automatic removal of the aggregate cellulose pulp occurs continuously with the passage of time occurs simultaneously over time.

5. The method of claim 1, further including the step of: extracting liquid from the shard.

6. The method of claim 5, further including the step of: separating the extracted liquid into a water based solution and material solids.

7. The method of claim 1, wherein the step of hydrolizing the shard further comprises the step of:

regulating the temperature within the hydrolizer to be in the range from of 300 degrees F. to 400 degrees F.

8. The method of claim 7, further including the step of: regulating the temperature within the hydrolizer to be 350 degrees Fahrenheit and regulating the pressure within the hydrolizer to be 120 psi gauge.

9. The method of claim 2, further including the step of: regulating the temperature within the hydrolizer to be 331 degrees Fahrenheit and regulating the pressure within the hydrolizer to be 90 psi gauge.

10. The method of claim 3, further including the step of: sterilizing the materials solids.

11. The method of claim 1, further including the step of: drying the aggregate cellulose pulp.

12. The method of claim 11, further including the step of: separating the aggregate cellulose pulp into substantially pure cellulose pulp and an inorganic pulp mixture.

13. The method of claim 11, farther including the step of: mixing the aggregate cellulose pulp with a plastic material.

14. The method of claim 13, further including the step of: extruding the mixture of aggregate cellulose pulp and plastic material into a useful article.

15. The method of claim 12, further including the step of: mixing the substantially pure cellulose pulp with a cellulose material.

16. The method of claim 15, further including the step of: extruding the mixture of substantially pure cellulose pulp and cellulose material into a useful article.

17. The method of claim 12, further including the step of: mixing the inorganic pulp mixture with a plastic material and extruding the combination of the inorganic pulp mixture and the plastic material.

\* \* \* \* \*